United States Patent [19]

Sato et al.

[11] Patent Number: 5,945,151

[45] Date of Patent: *Aug. 31, 1999

[54] PROCESS FOR PRODUCING SOY MILK AND PRODUCTS THEREOF

[75] Inventors: Shigeo Sato; Kazuhito Kusaka; Yoko Takayama, all of Tokyo, Japan

[73] Assignee: Kabushiki Kaisha Kibun Shokuhin, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,564

[22] Filed: Mar. 14, 1997

[30] Foreign Application Priority Data

| Mar. 15, 1996 | [JP] | Japan | 8-059138 |
| Mar. 15, 1996 | [JP] | Japan | 8-059141 |
| Mar. 15, 1996 | [JP] | Japan | 8-059142 |
| Mar. 15, 1996 | [JP] | Japan | 8-059159 |
| Mar. 15, 1996 | [JP] | Japan | 8-059170 |

[51] Int. Cl.$^6$ ............................ A23L 1/20
[52] U.S. Cl. ............ 426/634; 426/507; 426/520; 426/598
[58] Field of Search ............ 426/507, 634, 426/520, 598

[56] References Cited

U.S. PATENT DOCUMENTS

| 4,645,681 | 2/1987 | Sugisawa et al. | 426/634 |
| 4,855,159 | 8/1989 | Takao et al. | 426/507 |
| 4,915,972 | 4/1990 | Gupta | 426/634 |

FOREIGN PATENT DOCUMENTS

| 39-7971 | 5/1939 | Japan . |
| 38-14381 | 7/1953 | Japan . |
| 38-14382 | 7/1953 | Japan . |
| 61-1103 | 1/1986 | Japan . |
| 3-69496 | 1/1991 | Japan . |

*Primary Examiner*—Helen Pratt
*Attorney, Agent, or Firm*—Browdy and Neimark

[57] ABSTRACT

Soy-milk, concentrated soy-milk, powdery soy-milk and frozen soy-milk produced by heating GO at 45 to 65° C. for an instant to 20 minutes and then separating okara are disclosed. Use of the soy-milk of the present invention makes it possible to produce processed soybean protein foods with good properties.

23 Claims, No Drawings

PROCESS FOR PRODUCING SOY MILK AND PRODUCTS THEREOF

This invention relates to a process for producing soy-milk, the soy-milk produced by this process and processed soybean protein foods prepared by using the soy-milk. The present invention makes it possible to provide processed soybean protein foods with excellent qualities.

Processed soybean protein foods of various types are now on the market and the demands for these products is more and more increasing. In these days, tofu (soybean curd) is popular as a typical example of processed soybean protein foods not only in Japan but also in many other countries. To produce tofu, it is necessary to use soy-milk which is prepared by soaking soybeans in water and grinding to thereby give go (soybean paste), heating the go and then separating okara (the residue left after making tofu) therefrom. In the separation process of go, it has been a practice to employ a high temperature separation process or a low temperature separation process. The high temperature separation process, wherein go is heated at about 100° C. for 3 to 5 minutes, has been mainly employed for producing tofu in Japan. On the other hand, it is said that the low temperature separation process, wherein the heating temperature is regulated to 30 to 50° C., is advantageous in giving less unpleasant soybean taste due to isoflavone, etc. Compared with the high temperature separation process, however, only a low solid matter yield can be achieved by the low temperature separation process, which largely narrows its application range.

JP (kokoku) Sho 39-7971 is one of the references regarding the conventional techniques wherein the production process of soy-milk is discussed to give processed soybean protein foods with the desired qualities. The process disclosed by this patent is characterized by separating soy-milk under such conditions as to elevate the yields of protein and solid matters. According to this patent, it is recommended to perform the heating at 40 to 45° C. for 40 to 60 minutes. However, this process suffers from a serious problem. That is, a tofu product obtained by using the soy-milk prepared in accordance with such process shows elevated contents of protein and solid matter, indeed, but is poor in elasticity and taste. Therefore, the process for producing soy-milk still leaves much room for improvement.

On the other hand, JP (kokoku) 61-1103 and JP (kokoku) Hei 3-69496 disclose techniques for concentrating soy-milk drinks. The former patent discloses a process which comprises grinding soybeans with a polyphosphate solution in hot water and, after adjusting the pH value to 7.0 to 8.0, treating the soy-milk thus obtained with an enzyme followed by concentration. The latter patent discloses a process which comprises adjusting the pH value of soy-milk to 7.0 to 8.0, treating it with protease and then concentrating by heating to 115° C. or above for 1 to 60 seconds. Further, JP (kokoku) Sho 38-14382 provides an example wherein soy-milk for producing tofu is concentrated to give a solid matter content of 20%. However, no reference has reported so far how the concentration of soy-milk affects the tofu product. Therefore, it is impossible to deny the apprehension that the treatment for concentrating soy-milk might exert any undesirable effect on the qualities of tofu, so far as the prior art is concerned.

Moreover, JP (kokoku) Sho 38-14381 discloses a technique for spray drying soy-milk. According to this patent, soy-milk is spray dried at an inlet temperature of 115° C. and an outlet temperature of 60° C. Under these conditions, however, the prolonged extraction causes the oxidation of -SH group and, as a result, the desirable properties of the soy-milk are considerably deteriorated. Accordingly, it is impossible to produce powdery soy-milk suitable for the production of processed soybean protein foods by using this technique.

It is known that soybean protein is denatured when frozen. There has been published no report regarding a method for inhibiting the denaturation of soybean protein. On the contrary, a number of attempts have been made to effectively denature protein. These facts suggest that it is not practical to freeze soybean, since the utility value of soybean protein is deteriorated thereby. Under these circumstances, it has never been studied hitherto to freeze soy-milk prepared from soybean.

The present invention aims at providing processed soybean protein foods with excellent qualities. It further aims at providing soy-milk by which these excellent processed soybean protein foods can be produced. It furthermore aims at providing a process for producing this soy-milk. It still further aims at providing a technique by which soy-milk can be stored for a long time in a stable state while minimizing the denaturation of soybean protein.

As the results of extensive studies, the present inventors have found out that soy-milk with very good properties can be produced by heating go at 45 to 65° C. for an instant to 20 minutes and then separating okara. The soy-milk can be concentrated, powdered or frozen. Use of this soy-milk makes it possible to produce processed soybean protein foods having very good feel in mouth and texture.

Any go may be used herein without restriction, so long as it is prepared by a method commonly employed by those skilled in the art. In general, go can be prepared by soaking soybeans and then grinding. The starting soybeans are not particularly restricted. The soybeans are generally soaked so as to attain wet weight 2.2 times as much. After soaking, the soybeans may be ground by using, for example, a grinder, a mixer, a mass-colloider, etc. It is a practice to grind the soybeans while adding water thereto to thereby avoid the denaturation of protein due to the increase in temperature.

The go is heated at 45 to 65° C. for an instant to 20 minutes. The heating temperature preferably ranges from 50 to 65° C., still preferably from 55 to 65° C. The heating time preferably ranges from an instant to 10 minutes, still preferably from 3 to 7 minutes.

The heating temperature and the heating time largely affect the properties of the processed soybean protein foods, i.e., the final products. Namely, foods having desired feel in mouth and texture can be obtained by appropriately controlling the heating temperature and the heating time. In the production of tofu, for example, a product with a very good breaking strength can be obtained by regulating the heating temperature and the heating time respectively to 45 to 65° C. and not longer than 20 minutes. When the go still containing okara is heated at around 100° C for 3 to 5 minutes, as done in general, increasing the ratio of lipid in the soy-milk make it impossible to obtain any glossy, refined and smooth tofu product. Further prolonged heating time (40 to 60 minutes) makes it impossible to obtain any tofu product with preferable elasticity and deliciousness. It has never been clarified so far that the heating temperature and the heating time thus affect the properties of the final food product. Those skilled in the art can appropriately control the heating temperature and the heating time so that the most desirable properties can be imparted to the final product depending on the type of the product or consumers' preference.

The go may be heated by any way without restriction. Namely, it may be fed into a pot or the like and then indirectly heated with an electric heater, etc. Alternatively, it may be directly heated by, for example, blowing live steam thereto. Either method makes it possible to obtain processed soybean protein foods with excellent qualities.

Next, the go thus heated is separated out into okara and soy-milk. Although it is preferable to separate the go without cooling, it may be cooled prior to the separation. When heated, the go may be separated out immediately after attaining the desired temperature. Alternatively, it may be maintained at the desired temperature for a definite period of time and then separated out. The go may be separated out by a conventional method by using, for example, a centrifugal or hydraulic separation equipment.

In the production process of the present invention, the method for concentration is not particularly restricted. For example, vacuum concentration may be effected with the use of an evaporator or a centrifugal separator. It is not preferable to carry out the concentration under atmospheric pressure, though possible, since it is feared that the soy-milk is denatured by heating. When concentrated soy-milk is reconstituted by dilution and changes in the properties before and after the concentration are examined, no change is caused by the concentration up to about 3.5-fold. It is, therefore, obvious that according to the production process of the present invention, the soy-milk concentrated to a considerably high extent can sustain its properties.

This is seemingly because the protein structure remains unchanged, since the go is heated under mild conditions. Soy-milk, which has been heated under such severe conditions as employed in the prior art, has SH-group appearing on its surface and, therefore, cannot be concentrated unless it is subjected to a special treatment as described in JP (kokai) Hei 3-69496. In this case, moreover, the concentration can be carried out only to a low extent, i.e., about Brix 20. By using the process of the present invention, on the other hand, soy-milk with Brix 13 can be concentrated to the extent of about Brix 50. This fact clearly indicates that soy-milk can be very simply concentrated to give a high concentration in accordance with the present invention, compared with the prior techniques.

By diluting with water, the concentrated soy-milk produced by the process of the present invention can be reconstituted into one having the same extent of protein denaturation as that prior to the concentration. Thus it is usable in many ways similar to the common soy-milk. The concentrated soy-milk produced by the process of the present invention is particularly useful as the material for producing tofu. The tofu production may be carried out in the same manner as the one generally employed in the art. Use of the concentrated soy-milk produced by the process of the present invention makes it possible to give a tofu product which is superior in elasticity and deliciousness to the conventional ones. The tofu produced by using the concentrated soy-milk produced by the process of the present invention has another advantage of having a glossy, refined and smooth texture.

In the production process of the present invention, spray drying is performed under such conditions as not to interrupt the achievement of the initial object. For example, it is preferable to regulate the inlet temperature and the outlet temperature respectively to from 90 to 130° C. and from 20 to 65° C. It is still preferable to regulate the inlet temperature and the outlet temperature respectively to from 100 to 120° C. and from 50 to 60° C. It is furthermore preferable to regulate the inlet temperature and the outlet temperature respectively to 120° C. and 60° C. The outlet temperature varies depending on the distance from the inlet to the outlet. When the inlet temperature has been determined, the relationship between the distance from the inlet to the outlet and the outlet temperature can be confirmed by a method well known by those skilled in the art. The spray drying is carried out in the conventional manner with the use of a spray dryer commonly employed by those skilled in the art.

The powdery soy-milk obtained by spray drying has a high stability, light weight and small volume, compared with soy-milk. Therefore, it is highly suitable for storage. This powdery soy-milk can be easily reconstituted into soy-milk by dissolving in water. Thus, various foods can be produced by further processing this soy-milk. It is also possible to mix the powdery soy-milk directly with other food components followed by processing, without reconstituting into soy-milk.

It has been found that when frozen, the soy-milk or the concentrated soy-milk produced by the process of the present invention can be stored for a long time in a stable state while inhibiting the denaturation of soybean protein. The present invention also provides frozen soy-milk and processed soybean protein foods produced by using the frozen soy-milk.

To produce the frozen soy-milk of the present invention, freezing may be carried out by any method without restriction. For example, the soy-milk may be slowly frozen in a refrigerator. Alternatively, it may be quickly frozen by blowing a gas, for example, carbon dioxide gas or nitrogen gas thereto. It has been confirmed that either method makes it possible to maintain the properties of the soy-milk without any significant difference.

When stored, the frozen soy-milk of the present invention is maintained at such a temperature as to keep the frozen state. The storage temperature is preferably −15° C. or below, more preferably −20° C. or below, still more preferably −25° C. or below and still more preferably −30° C. or below. It is the most common practice to store the frozen soy-milk in a freezer, though the present invention is not restricted thereto. At a high storage temperature, there is a possibility that the protein is denatured and thus the utility value of the soy-milk is deteriorated. By using such soy-milk, less elastic and poor processed soybean protein foods such as tofu are produced. Accordingly, it is necessary that the frozen soy-milk is employed before the denaturation of protein proceeds to an undesirable level. The relationship between the storage temperature and the shelf life can be optionally known by those skilled in the art.

By thawing in, for example, running water, the frozen soy-milk of the present invention can be reconstituted into one having the same extent of protein denaturation as that prior to the freezing. Thus it is usable in many ways similar to the common soy-milk. The soy-milk thus thawed is usable as a starting material for producing various processed soybean protein foods. In particular, it is useful as the material for producing tofu. Use of the frozen soy-milk of the present invention makes it possible to give a tofu product which is excellent in elasticity and deliciousness. The tofu produced by using the frozen soy-milk of the present invention has another advantage of having a glossy, refined and smooth-texture.

By using the soy-milk of the present invention, tofu can be very easily produced compared with the conventional methods. That is, it becomes unnecessary to prepare soy-milk by soaking soybeans in water, grinding, heating and separating okara. As a result, tofu manufacturers need not to get up early in the morning and set to work any longer. In addition, the manufacturing equipment can be largely cut down. Since the soy-milk of the present invention can be stored in a stable state, it can be stored on a large scale and then taken out in the necessary amount as the need arises. Therefore, tofu of uniform qualities can be always produced to comply with the consumers' demand. Another advantage resides in that tofu can be produced in a small lot and thus the yield can be elevated.

When tofu is produced by using the soy-milk of the present invention, no okara is formed as the by-product. Accordingly, there arises no problem of the disposal of okara. Since the disposal of okara costs today, the economical advantage of the use of the soy-milk of the present invention cannot be ignored from this viewpoint too.

The soy-milk of the present invention is usable as a starting material for producing various foods, for example, tofu, yuba (soybean casein sheet) and aburaage (deep-fried soybean curd). Further, it may be processed into a soy-milk drink by diluting with water or blending with other components. It is furthermore usable in the production of seasonings such as mayonnaise and spread; fermented dairy products such as cheese and yogurt; frozen sweets such as frozen yogurt, ice cream and sherbet; fresh sweets such as custard pudding, pudding, Bavarian cream, whipped cream and milk shake; and secondarily processed soy-milk products such as soup and white sauce.

EXAMPLES

To further illustrate the present invention in greater detail, and not by way of limitation, the following Examples will be given.

Example 1

0.4 kg of dried soybeans were soaked in water at 15° C. so as to attain wet weight 2.2 times as much. The soaked soybeans were then ground in a grinder while adding 1.12 kg of water thereto to thereby give go. 2 kg of the go was fed into an enameled pot and heated to 60° C. over 8 minutes while thoroughly stirring so as to prevent the go from burning. When the temperature reached 60° C., the go was immediately pressed with a simple press provided with a jack. Thus okara was separated and 1.47 kg of soy-milk was obtained. To 1 kg of the soy-milk thus obtained was added 1.5 g of a defoaming agent for tofu and the resulting mixture was heated to 98° C. over 1 minute and 20 seconds by using live steam with pressure of 0.06 kgf/cm². Next, the steam pressure was lowered to 0.01 kgf/cm2 and heating was continued for additional 5 minutes. After adjusting the temperature of the soy-milk to 80° C., 1.8 g of a coagulant, which comprised 44% of glucono-δ-lactone, 26% of magnesium chloride, 26% of sodium citrate and 4% of an edible material and dissolved immediately before use to give a 10% solution, was added to 400 g of the soy-milk. The obtained mixture was maintained at 80° C. for 20 minutes and thus tofu was produced.

For comparison, tofu samples were produced under the same conditions as those described above but varying the condition for heating the go. In a comparative example, the go was heated to 40, 50, 70 and 80° C. and then the okara was immediately separated. In another comparative example, the go was heated to 40 and 50° C. and then maintained at these temperatures for 60 minutes followed by the separation of the okara.

The breaking strength of each tofu sample thus produced was measured in the following manner. On the next day of the production, the tofu was cut into pieces of 47 mm (diameter)×20 mm (height). Then the breaking strength was measured with a rheometer (Model CR-200D, manufactured by San Kagaku) by using a disc of 20 mm in diameter as a plunger at a penetration rate of 60 mm/min at room temperature (about 20° C.). Table 1 shows the results.

TABLE 1

| Heating temp. (° C.) | Heating time | Break strength (g) |
| --- | --- | --- |
| 40 | instant | 129 |
| 40 | 60 min | 165 |
| 50 | instant | 174 |
| 50 | 60 min | 144 |
| 60 | instant | 187 |
| 70 | instant | 132 |
| 80 | instant | 134 |

Example 2

The procedure of Example 1 was repeated but using live steam as the substitute for the electric heater employed in Example 1 to thereby produce tofu. After heating with the live steam to 40, 50, 60, 70 and 80° C. (heating time: 5 to 13 minutes), okara was immediately separated to give soy-milk. By using these soy-milks, tofu samples were produced in the same manner as the one of Example 1 and the breaking strength was measured. Table 2 shows the results.

TABLE 2

| Heating temp. (° C.) | Heating time | Break strength (g) |
| --- | --- | --- |
| 40 | instant | 157 |
| 50 | instant | 166 |
| 60 | instant | 170 |
| 70 | instant | 152 |
| 80 | instant | 142 |

Example 3

The procedure of Example 2 was repeated but adjusting the heating temperature (60° C.) to an instant and 5, 10, 20, 40 and 60 minutes. Then the breaking strengths of the tofu samples thus produced were measured. Table 3 shows the results. For comparison, the breaking strength of a tofu sample produced by the heat press process was also measured. At the step of gelation, the Brix of each soy-milk was adjusted to 13.0.

TABLE 3

| Heating temp. (° C.) | Heating time | Break strength (g) |
| --- | --- | --- |
| 60 | instant | 166 |
| 60 | 5 min | 176 |
| 60 | 10 min | 169 |
| 60 | 20 min | 171 |
| 60 | 40 min | 168 |
| 60 | 60 min | 157 |
| 100 (heat press) | 5 min | 165 |

Example 4

5 kg of dried soybeans were soaked in water at 15° C. so as to attain wet weight 2.2 times as much. The soaked soybeans were then ground in a grinder while adding 14 kg of water thereto to thereby give go. 25 kg of the go was fed into a cooking pot (manufactured by Takai Seisakusho) and heated to 60° C. over 3 minutes while thoroughly stirring.

When the temperature reached 60° C., the go was immediately pressed with a hydraulic press. Thus okara was separated and 18.8 kg of soy-milk with Brix 13.5 (solid matter content: 12.9%) was obtained.

This soy-milk was concentrated 1.47-, 2.21-, 2.95- and 3.73-folds by using an evaporator under reduced pressure to thereby give concentrated soy-milks. The material temperature of the soy-milk at concentration was 45° C.

Each of the concentrated soy-milks was reconstituted by diluting with water in such a manner as to give the same Brix (13.5) before the concentration. Thus the index of denaturation 1 of the soy-milk was determined in the following manner. The soy-milk was centrifuged at 3000 rpm for 10 minutes. Then the ratio of the solid matter content (%) of the supernatant to the solid matter content (%) before the centrifugation was referred to as the index of denaturation 1. Table 4 shows the results.

TABLE 4

| Brix | Concentration rate | Index of denaturation 1 |
|---|---|---|
| 13.5 (unconcentrated) | 1 | 95.3 |
| 19.9 | 1.47 | 96.3 |
| 29.9 | 2.21 | 95.0 |
| 39.8 | 2.95 | 95.1 |
| 50.4 | 3.73 | 95.5 |

The breaking strength of the tofu produced by using the unconcetrated soy-milk was 147 while that of the tofu produced by using the concentrated and reconstituted soy-milk was 140. No significant difference was observed between them.

Example 5

The procedure of Example 4 was repeated but adding 15 kg of water in the step of grinding. Thus soy-milk with Brix 12.5 was obtained. This soy-milk was concentrated to give Brix 45.0 (3.6-fold) by using a centrifugal thin film vacuum evaporator Model CEP-1 (manufactured by Okawara Seisakusho, 1500 rpm, heating temperature: 100° C., evaporation temperature: 45° C.). The soy-milk thus concentrated did not set to gel but remained in the liquid state.

Example 6

5 kg of dried soybeans were soaked in water at 15° C. so as to attain wet weight 2.2 times as much. The soaked soybeans were then ground in a grinder while adding 14 kg of water thereto to thereby give go. 25 kg of the go was fed into a cooking pot (manufactured by Takai Seisakusho) and heated to 60° C. over 3 minutes while thoroughly stirring. When the temperature reached 60° C., the go was immediately pressed with a hydraulic press. Thus okara was separated and 19 kg of soy-milk with Brix 13.0 (solid content: 12.7%) was obtained.

This soy-milk was cooled and powdered by using a spray dryer (Model L-8 manufactured by Okawara Seisakusho, flow rate: 2–3l/h, inlet temperature: 100–180° C., outlet temperature: 50–90° C.) to thereby give powdery soy-milk. This dissolved in water in such a manner as to give a concentration of us prepared was heated at 98° C. for 5 minutes and tofu was method as the one described in Example 1. Then the breaking measured. Table 5 shows the results.

TABLE 5

| Inlet temp. (° C.) | Break strength |
|---|---|
| 140 | 169 |
| 120 | 172 |
| 100 | 164 |

Example 7

Tofu samples were produced by repeating the procedure of Example 6 but varying the inlet temperature, outlet temperature and flow rate in the spray drying. Then the pared to each other in elasticity and deliciousness. Table 6 summarizes the results.

TABLE 6

| Inlet temp. (° C.) | Outlet temp. (° C.) | Flow rate (l/h) | Elasticity | Deliciousness |
|---|---|---|---|---|
| 180 | 90 | 3 | good | burnt smell |
| 160 | 80 | 3 | good | burnt smell |
| 140 | 70 | 3 | good | burnt smell |
| 120 | 60 | 2 | good | good |
| 100 | 50 | 2 | good | good |

Example 8

The moisture content, protein content and NSI of the powdery soy-milk prepared in Example 6 at the treatment temperature of 120° C. were measured by the conventional methods. This powdery soy-milk was dissolved in water to give a concentration of 13%. Then the indexes 1 and 2 of denaturation of this soy-milk were measured. The index of denaturation 2 of the soy-milk was determined in the following manner. The soy-milk was centrifuged at 3000 rpm for 10 minutes. Then the ratio of tent (%) of the supernatant to the protein content (%) before the was referred to as the index of denaturation 2. Further, tofu was produced by using this soy-milk in the same manner as the one of Example 1 and the breaking strength of this product was measured. Also, a marketed product "Hontofu" (manufactured by House Food Industrial Co., Ltd.) was subjected to the same test as a comparative example. Table 7 summarizes the results.

TABLE 7

| | Invention product | Comparative example |
|---|---|---|
| (Property of soy-milk) | | |
| moisture content (%) | 4.25 | 2.05 |
| protein content (%) | 48.02 | 43.64 |
| NSI (%) | 96.58 | 95.51 |
| index of denaturation 1 | 91.8 | 79.5 |
| Index of denaturation 2 | 87.5 | 85.5 |
| (Physical data of tofu) | | |
| break strength (g) | 165 | 112 |

Example 9

Tofu samples were produced in accordance with the procedure of Example 1 except by using the following 3 soy-milks, namely, one prepared by separating the okara at room temperature without heating the go (low temperature separation process); one prepared by heating the go and, when the temperature reached 60° C., immediately separating the okara (the process of the present invention); and one prepared by heating the go at 98° C. for 5 minutes and then separating the okara (high temperature separation process). In the production of tofu, heating was effected at 98° C. for 5 minutes. Then the breaking strength of each tofu sample thus produced was measured. Table 8 shows the results.

TABLE 8

| Production process | Break strength (g) |
|---|---|
| live press process | 115 + 6 |
| invention process | 158 + 12 |
| heat press process | 115 + 10 |

Example 10

10 kg of dried soybeans were soaked in water at 15° C. so as to attain wet weight 2.2 times as much. The soaked soybeans were then ground in a grinder while adding 28 kg of water thereto to thereby give go. 50 kg of the go was fed into a cooking pot (manufactured by Takai Seisakusho) and heated to 60° C. over 4 minutes while thoroughly stirring. When the temperature reached 60° C., the go was immediately pressed with a hydraulic press. Thus okara was separated and 36.8 kg of soy-milk with Brix 13.0 (solid matter content: 12.8%) was obtained. After cooling, this soy-milk was packed in a pouch and slowly frozen in a freezer at −30° C. Before packing in the pouch, a sample containing 0.75%, based on the soy-milk, of sorbitol and another one containing 0.75% of trehalose were also prepared.

These frozen soy-milk products were stored in a freezer at −30° C. and then thawed in running water. Then the indexes 1 and 2 of denaturation were monitored with the passage of time.

In the same manner as the one of Example 1, Tofu was produced by using the soy-milk thawed in running water and the breaking strength of this product was measured. Table 9 shows the results.

TABLE 9

| Additive | Storage time (days) | Break strength (g) | Index of denaturation 1 | Index of denaturation 2 |
|---|---|---|---|---|
| none | 1 | 153 | 98.2 | 101.2 |
|  | 13 | 168 | 94.4 | 84.2 |
|  | 28 | 152 | 92.7 | 84.4 |
| sorbitol | 1 | 151 | 97.7 | 101.7 |
|  | 13 | 158 | 96.7 | 84.0 |
|  | 28 | 167 | 93.1 | 85.5 |
| trehalose | 1 | 153 | 98.9 | 103.6 |
|  | 13 | 157 | 91.2 | 84.9 |
|  | 28 | 155 | 93.8 | 82.3 |

Example 11

The procedure of Example 10 was repeated but the soy-milk was frozen not slowly in a freezer at −30° but quickly with carbon dioxide gas at −30° C. to thereby give frozen soy-milk. Then the breaking strength and index of denaturation were monitored with the passage of time similar to Example 10. Table 10 summarizes the results.

TABLE 10

| Additive | Storage time (days) | Break strength (g) | Index of denaturation 1 | Index of denaturation 2 |
|---|---|---|---|---|
| none | 1 | 1539 98.1 | 101.0 |  |
|  | 13 | 142 | 93.9 | 81.6 |
|  | 28 | 154 | 92.2 | 83.5 |
| sorbitol | 1 | 155 | 96.4 | 100.0 |
|  | 13 | 155 | 92.7 | 82.9 |
|  | 28 | 169 | 93.5 | 85.0 |
| trehalose | 1 | 153 | 98.1 | 102.4 |
|  | 13 | 159 | 97.0 | 83.8 |
|  | 28 | 164 | 93.0 | 80.0 |

Example 12

10 kg of dried soybeans were soaked in water at 15° C. so as to attain wet weight 2.2 times as much. The soaked soybeans were then ground in a grinder while adding 28 kg of water thereto to thereby give go. 50 kg of the go was fed into a cooking pot (manufactured by Takai Seisakusho) and heated to 60° C. over 4 minutes while thoroughly stirring. When the temperature reached 60° C., the go was immediately passed with a hydraulic press. Thus okara was separated and 37.5 kg of soy-milk with Brix 13.8 (solid matter content: 12.9%) was obtained.

Either as such or after adding 0.75% based on the soy-milk of sorbitol, this soy-milk was concentrated 3-fold under reduced pressure with an evaporator. The concentrated soy-milk were in the liquid form with Brix 42.2 and 43.8. These concentrated soy-milk products were packed in pouches, frozen and stored in a freezer at −30° C. Then the breaking strength and index of denaturation were monitored with the passage of time similar to Example 10. Table 11 shows the results.

TABLE 11

| Additive | Storage time (days) | Break strength (g) | Index of denaturation 1 | Index of denaturation 2 |
|---|---|---|---|---|
| none | 1 | 135 | 98.9 | 97.7 |
|  | 7 | 140 | 98.8 | 98.5 |
|  | 28 | 156 | 98.8 | 99.3 |
|  | 79 | — | 95.8 | 96.6 |
| sorbitol | 1 | 141 | 98.6 | 98.5 |
|  | 7 | 136 | 99.7 | 98.6 |
|  | 28 | 150 | 99.1 | 99.1 |
|  | 79 | — | 97.2 | 97.3 |

Example 13

The procedure of Example 12 was repeated but adding 30 kg of water in the step of grinding. Thus soy-milk with Brix 12.5 (solid matter content: 12.5%) was obtained. This soy-milk was oncentratedto give Brix 45.0 (3.6-fold) by using a centrifugal thin film vacuum evaporator Model CEP-1 (manufactured by Okawara Seisakusho, 1500 rpm, heating temperature: 100° C., evaporation temperature: 45° C). After freezing in a freezer at −30° C., the soy-milk was stored at −30, −20 and −15° C. and the breaking strength and index of denaturation were monitored with the passage of time similar to Example 10. For comparison, unconcentrated soy-milk was stored at −30° C. for 4 days and subjected to the same test. Table 12 shows the results.

TABLE 12

| Storage temp. (° C.) | Storage time (days) | Break strength (g) | Index of de-naturation 1 | Index of de-naturation 2 |
| --- | --- | --- | --- | --- |
| (unconcentrated soy-milk immediately after separation) | | | | |
| −30 | 4 | 152 | 93.0 | 82.3 |
| (concentrated soy-milk) | | | | |
| −30 | 4 | — | 92.6 | 96.9 |
|  | 13 | 145 | 92.5 | 93.7 |
| −20 | 4 | — | 96.1 | 98.1 |
|  | 13 | 120 | 88.9 | 88.9 |
| −15 | 4 | — | 94.8 | 99.2 |
|  | 13 | 115 | 58.5 | 88.4 |

Example 14

In accordance with the procedure of Example 10, soy-milk containing neither sorbitol nor trehalose was produced, but treating the go at 60, 70, 80, 90 and 98° C. for an instant. Each soy-milk product thus obtained was frozen and stored at −30° C. for 8 hours. Then the indexes 1 and 2 of denaturation were measured. Table 13 shows the results.

TABLE 13

| Temp. (° C.) | Index of denaturation 1 | Index of denaturation 2 |
| --- | --- | --- |
| 60 | 92.7 | 85.8 |
| 70 | 89.9 | 83.9 |
| 80 | 76.9 | 86.3 |
| 90 | 43.2 | 31.0 |
| 98 | 40.3 | 19.5 |

We claim:

1. A process for producing soy-milk which comprises heating GO at a temperature within the range of 45–65° C. and for a time within the range of an instant to 20 minutes, without reducing free oxygen concentration, said time and temperature being sufficient to produce soy-milk which can be processed to tofu having good gloss, smoothness and mouth feel, and then separating okara.

2. A process as claimed in claim 1, wherein the heating temperature ranges from 55 to 65° C.

3. A process as claimed in claim 1, wherein the heating time ranges from an instant to 10 minutes.

4. A process as claimed in claim 1, wherein the heating time ranges from 3 to 7 minutes.

5. A process as claimed in claim 1, wherein the soy-milk is concentrated after removing the okara from GO.

6. A process as claimed in claim 5, wherein the concentration is made to give Brix 45 or below.

7. Frozen soy-milk obtained by freezing soy-milk produced by a process as claimed in claim 6.

8. A process for producing a processed soybean protein food which comprises thawing and processing frozen soy-milk as claimed in claim 7.

9. A processed soybean protein food produced by a process as claimed in claim 8.

10. A processed soybean protein food as claimed in claim 9, which is selected from among the group consisting of tofu, yuba, aburaage, soy-milk drink, mayonnaise, spread, cheese, yogurt, frozen yogurt, ice cream, sherbet, custard pudding, pudding, Bavarian cream, whipped cream, milk shake, soup and white sauce.

11. A method for storing frozen soy-milk comprising storing frozen soy-milk as claimed in claim 7 at a temperature of −15° C. or below.

12. A method for storing frozen soy-milk as claimed in claim 11, wherein said storage temperature is −20° C. or below.

13. A method for storing frozen soy-milk as claimed in claim 11, wherein said storage temperature is −25° C. or below.

14. Soy-milk produced by a process as claimed in claim 6.

15. Frozen soy-milk obtained by freezing soy-milk produced by a process as claimed in claim 6.

16. A process as claimed in claim 1, wherein the soy-milk is powdered by spray drying after removing the okara from GO.

17. A process as claimed in claim 16, wherein the inlet temperature and outlet temperature in the spray drying are regulated respectively to from 90 to 130° C. and to from 20 to 65° C.

18. Soy-milk produced by a process as claimed in claim 17.

19. Soy-milk produced by a process as claimed in claim 1.

20. A process for producing a processed soybean protein food which comprises producing soy-milk by heating GO at a temperature within the range of 45–65° C. and for a time within the range of an instant to 20 minutes, without reducing free oxygen concentration, said time and temperature being sufficient to produce soy-milk which can be processed to tofu having good gloss, smoothness and mouth feel, and then separating okara, and then processing said soy-milk to produce a processed soybean protein food.

21. A processed soybean protein food produced by a process as claimed in claim 20.

22. A processed soybean protein food as claimed in claim 21 which is selected from among the group consisting of tofu, yuba, aburaage, soy-milk drink, mayonnaise, spread, cheese, yogurt, frozen yogurt, ice cream, sherbet, custard pudding, pudding, Bavarian cream, whipped cream, milk shake, soup and white sauce.

23. Tofu having good gloss, smoothness and mouth feel, produced by the process of claim 20.

* * * * *